No. 831,673. PATENTED SEPT. 25, 1906.
H. R. LYNN.
COFFEE OR TEA URN.
APPLICATION FILED JULY 12, 1905.
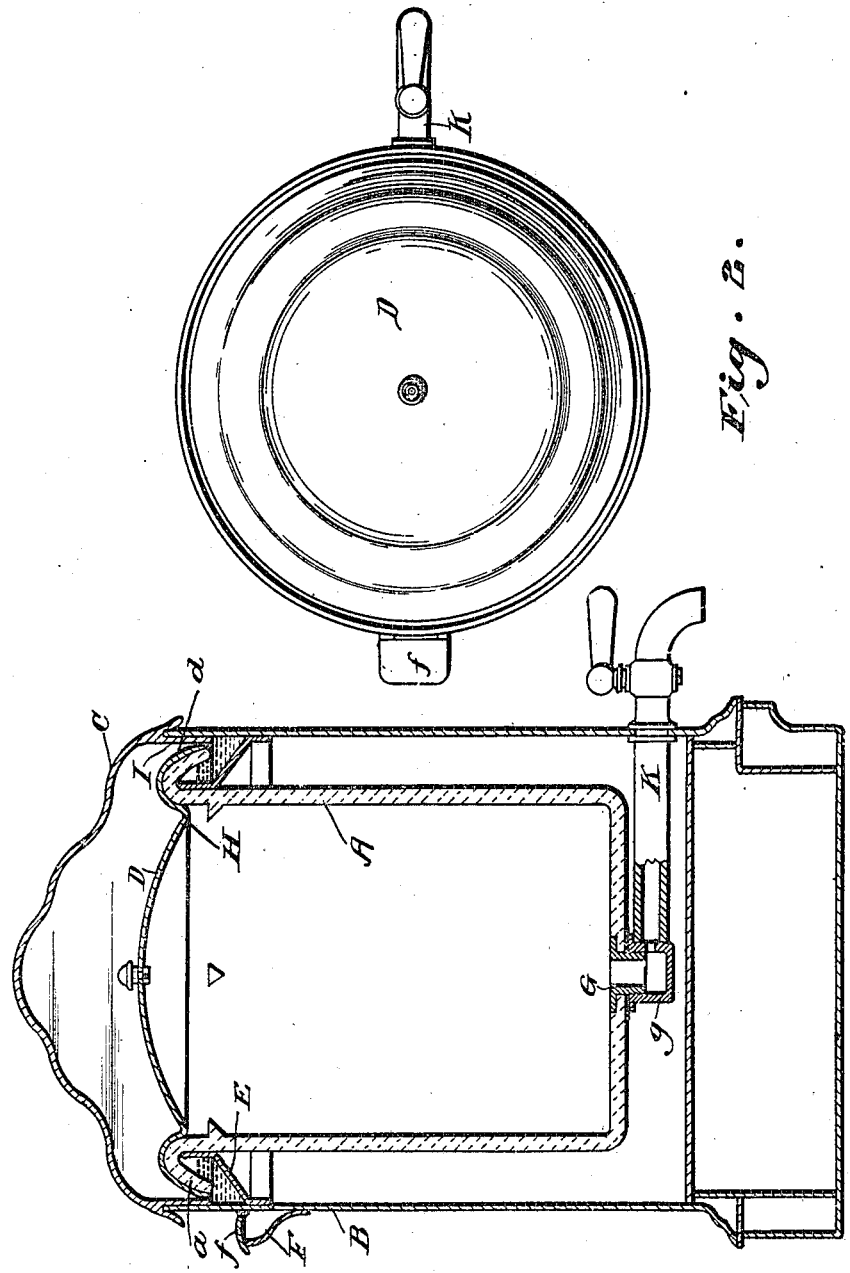
Witnesses
M. A. Schmidt
Geo. E. Tew
Inventor
Howard R. Lynn
By Milo B. Stevens & Co.
Attorneys.

UNITED STATES PATENT OFFICE.

HOWARD R. LYNN, OF CLEVELAND, OHIO.

COFFEE OR TEA URN.

No. 831,673.  Specification of Letters Patent.  Patented Sept. 25, 1906.

Application filed July 12, 1905. Serial No. 269,373.

*To all whom it may concern:*

Be it known that I, HOWARD R. LYNN, a citizen of the United States, residing at Cleveland, in the county of Cuyahoga and State of Ohio, have invented new and useful Improvements in Coffee or Tea Urns, of which the following is a specification.

This invention relates to coffee or tea urns, and has particular reference to the manner of covering and sealing the crock or vessel which contains the coffee or tea and to the means for sealing the water-jacket and for supporting the crock or reservoir therein.

In the accompanying drawings, Figure 1 is a central vertical section of the urn. Fig. 2 is a top view with the cover removed.

Referring specifically to the drawings, A indicates the crock or reservoir which contains the tea, coffee, or other liquid. This has at the top a rim $a$, which is rolled or extended outwardly and downwardly to form a trap in connection with an annular trough produced by the metal ring E, which is soldered on the inside of the jacket or casing B. The rim of the crock rests on the upper edge of the ring E, whereby the crock is supported in place within the casing. The reservoir A will ordinarily be made of stoneware, but may be made of porcelain, copper, enameled steel, or other suitable material.

The outlet-pipe K is connected to the reservoir by a nipple G, which is screwed into a proper socket $g$, formed to receive it, on the inner end of the draw-off pipe K.

The cover to the reservoir is indicated at D, and this is characterized particularly by the formation of an annular rib or bead H therein which fits within the rim of the crock, and the outer edge or rim $d$ of the cover is shaped to lap the rim $a$ and to also dip below the surface of the water which is placed in the trough E.

The cover C of the casing or jacket is provided with a depending rim I, which fits within the top of the casing and also dips into the water-trap in the trough E.

The ring E, which forms the trough, also forms the support for the crock A and takes the weight and strain off the outlet-pipe K and the connection G. The trough is filled with water, and the rims $a$, $d$, and I dip below the surface thereof, and thereby form a water-trap. This prevents the escape of the aromatic vapor from the crock and also prevents the escape of steam from the casing B. An outlet, however, for any steam-pressure generated in the water-jacket is provided by the filling-cup F, the lid $f$ of which is hinged and will open under pressure. The seal of the crock preserves the aroma of its contents, as the vapor arising cannot escape through the water-joint. Such condensation as takes place on the under side of the cover D drips back into the crock from the under side of the rib or bead H and is thus prevented from leaking out into the outer vessel. The rim I, projecting into the water-trap, adds further to the effectiveness of the seal.

What I claim as new, and desire to secure by Letters Patent, is—

The combination with a casing having a trough extending around within the top edge thereof, of a cover on the casing having a rim which dips into the trough, an inner vessel having at the top a depending rim which dips into the trough and is adapted to be sealed by water therein, and a cover on the inner vessel having a rim shaped to fit the rim of said vessel and depending into the trough.

In testimony whereof I have signed my name to this specification in the presence of two subscribing witnesses.

HOWARD R. LYNN.

Witnesses:
JOHN A. BOMMHARDT,
SHIRLEY BOMMHARDT.